United States Patent [19]
Goodman

[11] Patent Number: 5,354,521
[45] Date of Patent: * Oct. 11, 1994

[54] METHOD OF MAKING A MAGNETICALLY DETECTABLE PLASTIC PIPE

[75] Inventor: William L. Goodman, Mountain View, Calif.

[73] Assignee: Gas Research Institute, Chicago, Ill.

[*] Notice: The portion of the term of this patent subsequent to Jul. 30, 2008 has been disclaimed.

[21] Appl. No.: 831,160

[22] Filed: Feb. 5, 1992

[51] Int. Cl.⁵ .................... B29C 47/00; B29D 23/22
[52] U.S. Cl. ..................... 264/24; 264/108; 264/211.12; 264/DIG. 58; 425/3; 425/DIG. 33
[58] Field of Search .............. 264/24, 171, 173, 108, 264/104, 248, 211.12, DIG. 58; 425/3, 131.1, 133.1, DIG. 33; 405/157; 138/104

[56] References Cited

U.S. PATENT DOCUMENTS

| | | | |
|---|---|---|---|
| 5,006,806 | 4/1991 | Rippingale et al. | 138/104 |
| 5,014,753 | 5/1991 | Rossignol et al. | 138/104 |
| 5,036,210 | 7/1991 | Goodman | 138/104 |
| 5,114,517 | 5/1992 | Rippingale et al. | 264/24 |

FOREIGN PATENT DOCUMENTS 2832547 2/1980 Fed. Rep. of Germany ...... 138/104
60-82881 5/1985 Japan .

Primary Examiner—Mathieu Vargot
Attorney, Agent, or Firm—Neal J. Mosely

[57] ABSTRACT

A magnetically detectable plastic pipe having magnetic particles distributed in the wall of the pipe so that it is easily detected from the surface when buried in the ground, in a wall in concrete or other distant or relatively inaccessible locations. The magnetic particles are preferably distributed in the wall of the pipe by extrusion with the plastic at the time the pipe is formed and the pipe is passed through a magnet to magnetize the pipe diametrically with one pole on one side of the pipe and the other pole diametrically opposite. The pipe magnetization polarity may be selectively reversed to encode a unique magnetic signature to the pipe. Changing the magnetization polarity may also be used to encode data on the pipe. The pipe may be rotated and passed linearly through the magnet, or the magnet may be rotated around the pipe to produce a spiralled diametrically oriented magnetic structure. Another magnetic material used is strontium ferrite.

9 Claims, 8 Drawing Sheets

METHOD OF MAKING A MAGNETICALLY DETECTABLE PLASTIC PIPE

FIELD OF THE INVENTION

This invention relates to new and useful improvements in magnetically detectable plastic pipe and to methods of preparing such pipe and to encoding and detecting such pipe.

BRIEF DESCRIPTION OF THE PRIOR ART

In many situations there is a need to locate pipes below the surface of the earth, either to service or repair them or to avoid inadvertent damage when subsequently excavating in the vicinity. Much of the pipe used in construction today, particularly for natural gas lines, is plastic rather than metal.

Plastic pipe is typically polyethylene, but may also be other formulations such as polyvinylchloride (PVC). Plastic pipe has several advantages. It is extremely durable and reliable, relatively lightweight, easy to make, and cheaper than most other materials that may be used. Perhaps most importantly, it is essentially inert, so that nothing sent through it will react with it, unlike some other materials.

One problem in using plastic pipe, however, is that once buried it is difficult to find, thus making it difficult to service the pipe and more likely that unintentional damage will result from nearby digging.

Various attempts have been made to solve this problem. Ribbons have been buried above the pipes, so that one could in theory locate the pipe by digging until the ribbon, of a color contrasting to the soil, was found. See, e.g., Allen, U.S. Pat. No. 3,115,861, and Prosser, U.S. Pat. No. 3,282,057. However, since two separate items must be buried, it is difficult to locate the ribbon accurately over the pipe, and the ribbon may "drift" away from the pipe after it is buried, thus making it more difficult to locate the pipe even if the ribbon is found. Also, the ribbon must later be located by digging as there is no way to detect it from above ground. Finally the ribbons may break or get lost in the soil being excavated, particularly where substantial digging is done, such as by heavy equipment, and may thus be lost before they can be located.

Similarly, metal foils have also been buried above pipes, as in Allen, U.S. Pat. No. 3,504,403, and Allen et al., U.S. Pat. No. 3,633,533, the alleged advantage being that these may be detectable from the surface by a metal detector device. Again, however, the problems of accurate placement of the ribbon over the pipe and the possible drift render this solution unsatisfactory.

A variation on this theme is shown in Southworth et al., U.S. Pat. No. 3,568,626, which describes reinforcing a metal foil with some other material, such as nylon, fiberglass or steel, so that the foil is not easily broken, and using shorter portions or stretchable portions so that an equipment operator will hopefully see a portion uncovered by the excavation before the pipe is damaged. The metal foil may contain either magnetic or radioactive material so that once that part of the foil is located by digging, the remainder can be followed from above ground by an appropriate detector. Again, however, the foil must be buried over the pipe, and problems of drift and breakage remain. As with colored ribbons, it is possible that the operator will not see the foil before striking the pipe.

Keene, U.S. Pat. No. 4,573,829 involves a somewhat similar concept, in which a wire is placed inside the pipe. The wire can be detected either by a magnetometer, if the wire is magnetic, or by applying an R.F. signal to the wire and locating it with an R.F. sensing device. However, just as the ribbons described above require an extra step to bury, an extra step is required here to insert the wire into the pipe during construction of the pipeline. Also, if it is desirable to apply the R.F. signal to the wire, the ends must be located to do so. Finally, it is possible that the wire may break, thus preventing detection by R.F. methods, since an open circuit would result and no signal could be applied in such a case.

There have been other efforts to mark the location of an underground pipe, such as placing markers in the ground or inscribed in the pavement near the location of the pipe. These are generally not accurate enough to solve the problem, and much time can be wasted in locating the pipe even when there is a marker in the general vicinity.

A number of patents have addressed the possibility of making magnetizable plastic pipe on similar products.

Cosman et al, U.S. Pat. No. 4,767,237 discloses tapes with spaced resonant markers buried in the ground above buried pipe to facilitate detection by a surface detector.

Nakamura et al, U.S. Pat. Nos. 4,573,016 and 4,449,098 disclose an electric wire buried in the ground above buried pipe to facilitate detection by a surface detector.

Sherlock RE Ser. No. 30,393 discloses an electric wire buried in the ground and bonded to buried pipe to facilitate detection by a surface detector.

Baermann, U.S. Pat. No. 3,229,030 discloses an electric wire with an insulation with barium ferrite embedded therein and magnetized crosswise. The magnets are used to adhere the insulated wire to a magnetic surface.

Baermann, U.S. Pat. No. 3,191,106 discloses flexible magnets for sealing refrigerator doors made by extruding rubber or plastic with barium ferrite particles dispersed therein.

Reisch, U.S. Pat. No. 3,254,859 discloses a coiling strip with a plastic coating with magnetic particles dispersed therein.

Ellis, U.S. Pat. No. 3,111,735 discloses a flexible magnetic closure used for closure flaps of wearing apparel, shoes, etc.

Josephson, U.S. Pat. No. 3,942,147 discloses a display board with spaced magnetic poles for securing indicia or characters thereon.

Japanese 60-82881 (Inventor Yasuo Ishii) (Assignee Taisei Kenetsu K.K.) discloses a synthetic resin underground pipe formed with a ferrite-blended resin and then magnetized so that it can be detected from the surface when buried in the ground.

German, U.S. Pat. No. 3,106,661 discloses magnetizable metal foils placed on underground cable for detection from the surface.

German, U.S. Pat. No. 1,052,559 discloses that conductors in a cable sheath are detected from the surface for locating short circuits in splicing boxes.

German, U.S. Pat. No. 1,943,914 discloses that planar magnets are formed in tapes or plates by dispersing barium ferrite therein.

Japan 55-109,977 (Yamauchi) discloses a ferrite magnet block buried adjacent to the joints of pipe underground to facilitate location by a surface operated field detector.

Rippingale et al, U.S. Pat. Nos. 5,006,806 and 5,017,873 disclose a method and apparatus for locating, tracing, and identifying buried fiber optic cable, ducts, conduits and pipes by a rubber strip magnet (barium ferrite) magnetized across the width of the strip and wound helically on the fiber optic cable, tube, pipe or duct. The strip or stripe may be painted or coated on the object or may be extruded into or molded in the outer surface of the object and then magnetized. Another embodiment comprises a plurality of magnetic strip magnets oriented longitudinally of the object (hollow tube) or a plurality of magnetic strip magnets in short segments oriented longitudinally of the object (hollow tube).

Goodman, U.S. Pat. No. 5,036,210 discloses a method of producing magnetically detectable plastic pipe for underground use comprising mixing particles of electrically-nonconductive, highly-magnetizable iron oxide or barium ferrite uniformly with organic plastic, heating and extruding the mixture to produce a hollow tubular pipe having said highly magnetized particles distributed and proportioned so that the plastic pipe may be easily detected by magnetic detection apparatus on the surface when the plastic pipe is buried at three to five feet or more under the ground.

Goodman, U.S. Pat. No. 5,051,034 discloses a magnetically detectable plastic pipe for underground use hollow tubular plastic pipe having particles of electrically-nonconductive, highly-magnetized iron oxide or barium ferrite embedded in plastic and secured integrally with the wall of said pipe of a size, shape, distribution and proportion such that the plastic pipe may be easily detected by magnetic detection apparatus on the surface when the plastic pipe is buried at three to five feet, more or less, under the ground. This disclosure mentioned only two magnetic materials, and it offered little specific information about how to encode magnetic information.

SUMMARY OF THE INVENTION

One of the objects of this invention is to provide a magnetically detectable plastic pipe whose position can be easily detected from a distance, e.g., from the surface when buried in the ground or in buildings or foundations, in storage, etc.

Another object of this invention is to provide a magnetically detectable plastic pipe wherein magnetic particles are distributed in the wall of the pipe so that it is easily detected from a distance, e.g., from the surface when buried in the ground or in buildings or foundations, in storage, etc.

Another object of this invention is to provide a magnetically detectable plastic pipe wherein magnetic particles are distributed in the wall of the pipe by extrusion with the plastic at the time the pipe is formed so that it is easily detected from a distance, e.g., from the surface when buried in the ground or in buildings or foundations, in storage, etc.

Another object of this invention is to provide a new and improved magnetic material suitable for this application.

Another object of this invention is to provide a new and improved method of maximizing the magnetization of the pipe by aligning the magnetic moments of the magnetic particles.

Another object of this invention is to provide new and improved ways of encoding information magnetically so that the depth and size of the buried pipe can be read more readily from above the ground by a magnetic detection apparatus.

Other objects of the invention will become apparent from time to time throughout the specification and claims as hereinafter related.

DESCRIPTION OF THE PREFERRED EMBODIMENTS

Configurations of Pipe and Methods of Fabrication

This invention relates to magnetically detectable plastic pipe for underground use. It consists of a hollow tubular plastic pipe having particles of magnetic material embedded and secured integrally within the wall of the pipe. The magnetic material consists of electrically nonconductive, highly magnetizable particles of a shape, size, distribution, and proportion such that the plastic pipe may be detected from a distance by a magnetic detection apparatus, e.g., the apparatus being on the surface when the plastic pipe is buried at a selected depth, e.g., three to five feet, more or less, under the ground. The particles may be strontium ferrite, barium ferrite, iron oxide or other highly magnetizable materials.

The magnetic particles may be uniformly distributed throughout the thickness of the plastic pipe. They may also be distributed in discrete portions of the pipe, for instance, in a uniform outer layer, or in strips extending along the pipe.

In another embodiment, the plastic pipe may be formed without magnetic particles, and the magnetic particles provided in a separate plastic strip. The plastic strip may be coextruded with the pipe, or it may be formed separately and fused or adhered to the wall of the pipe.

In either case, the concentration of magnetic particles must be high enough to produce the desired magnetic effect, viz., to facilitate detection of the pipe from above the ground when the pipe is buried to depth of three to five feet, or deeper.

Figure 1:
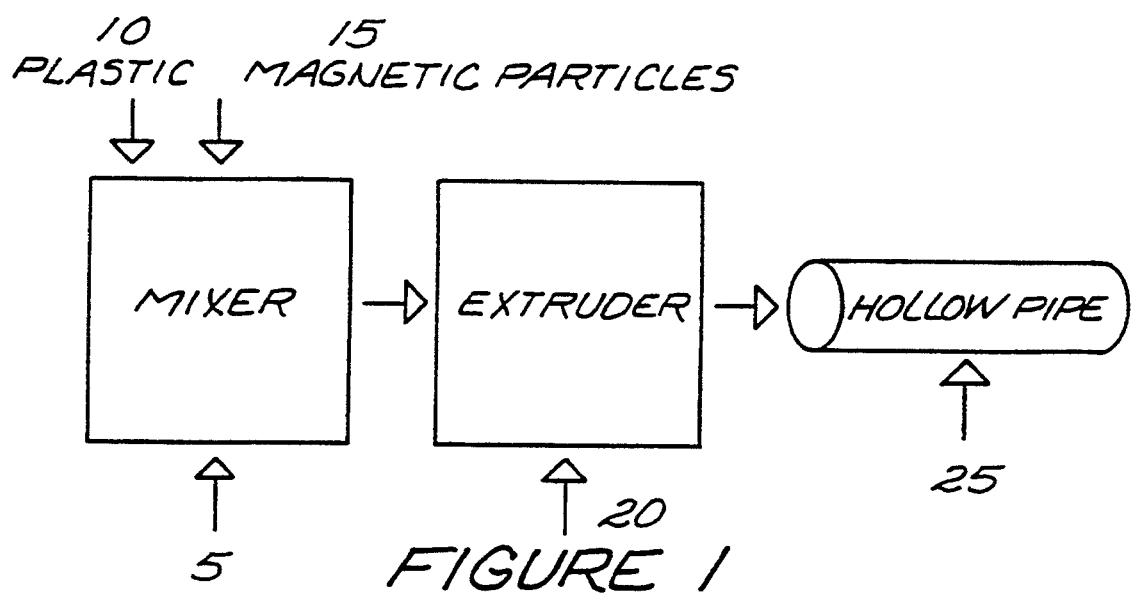
FIG. 1 is a flow diagram of the extrusion or coextrusion of plastic pipe containing particles of magnetic material.

FIG. 1 shows a schematic block diagram of an apparatus and method for extruding pipe. A conventional plastics extrusion mixer 5 receives a supply of extrudable plastic 10, usually powder or pellets, and a supply of magnetic particles 15. The plastic 10 may be polyethylene, polyvinyl, or other moldable or extrudable organic resin polymers. The magnetic particles may be strontium ferrite, barium ferrite, iron oxide, or any other highly magnetizable material, i.e., a material which will magnetize readily and remain magnetized for a very long time.

Sometimes magnetic particles and plastic powder are premixed and made into pellets (a process called compounding) before being fed to an extruder to make pipe. This enables a more uniform mixing of the magnetic particles and plastic material than occurs in the hopper of an extruder. Prepelletizing is especially important because typical magnetic particles are more massive than plastic and tend to settle in the extruder hopper resulting in an uneven distribution of magnetic particles in the pipe.

The mixture of molten plastic 10 and magnetic particles 15 flows from the mixer 5 to a plastics extruder 20, where it is extruded into a hollow tubular pipe 25. The distribution of the magnetic particles within the plastic pipe is determined by the type of extrusion die used. One conventional type of extrusion die will mix the magnetic particles uniformly throughout the wall of the pipe.

Figure 2:
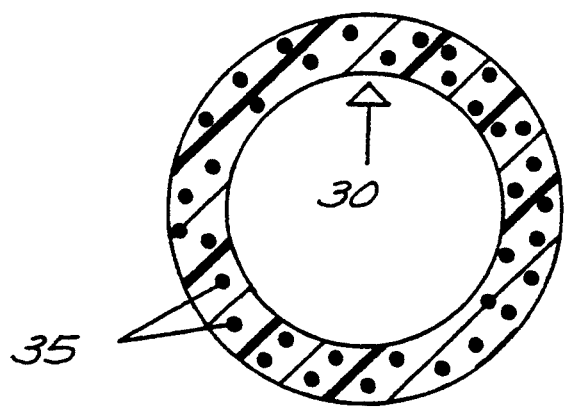
FIG. 2 is a lateral cross section of an extruded plastic pipe containing uniformly dispersed particles of magnetic material.
Figure 3:
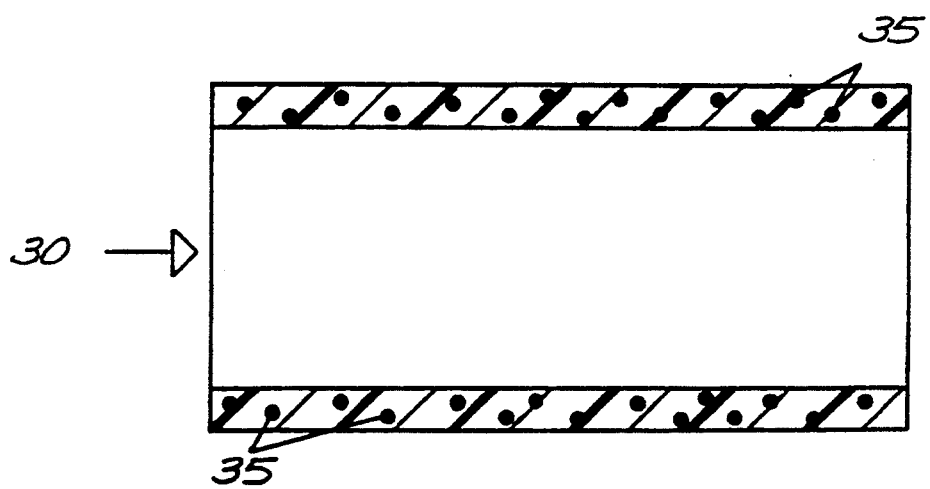
FIG. 3 is a longitudinal cross section of an extruded plastic pipe containing uniformly dispersed particles of magnetic material.

FIG. 2 shows a lateral cross section of pipe 30 produced by such a process, with magnetic particles 35 uniformly distributed throughout the wall of the pipe. FIG. 3 shows a longitudinal section of the same pipe 30 and its uniformly dispersed magnetic particles 35.

Another conventional type of extrusion die will produce a composite structure consisting of an inner layer which may consist of plastic without magnetic particles, and an outer layer which may consist of plastic mixed with magnetic particles. A conventional extrusion die with separate extrusion nozzles for each layer will accomplish this result.

Figure 4:
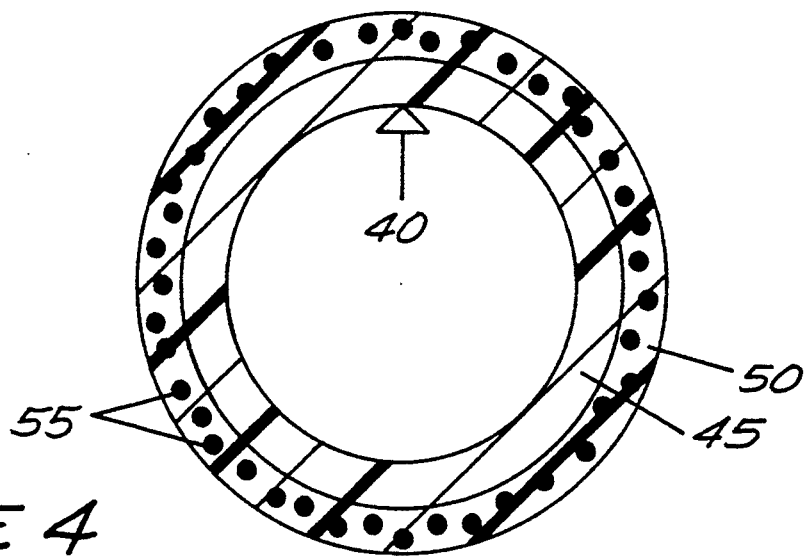
FIG. 4 is a lateral cross section of an extruded plastic pipe containing particles of magnetic dispersed in the outer section of the wall.

FIG. 4 shows a lateral cross section of a pipe 40 produced with such a process, consisting of an inner layer 45 of plastic free of magnetic particles and an outer layer 50 in which magnetic particles 55 are uniformly distributed. The inner layer 45 and the outer layer 50 may have the same thickness. Otherwise, the inner layer 45 may constitute most of the thickness of the pipe, and the outer layer 50 may constitute a thin coating.

Figure 5:
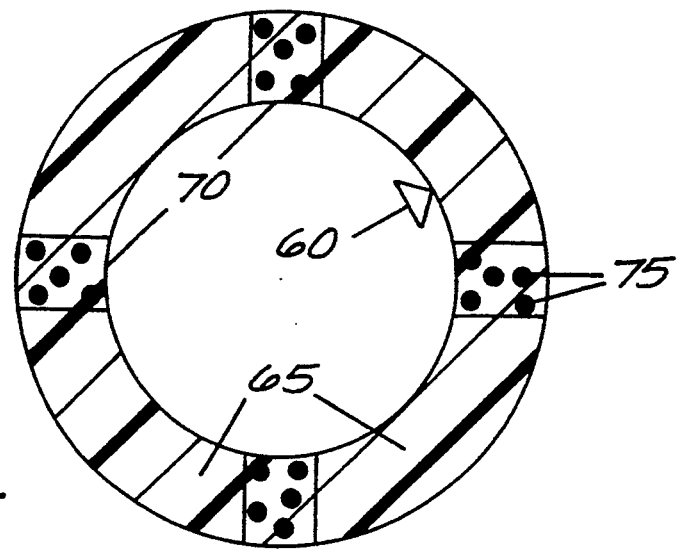
FIG. 5 is a lateral cross section of an extruded plastic pipe containing particles of magnetic material dispersed uniformly with stripes of material running longitudinally down the pipe wall.

Another conventional type of extrusion die provides segmented outlets for extruding separate streams of plastic of different compositions. One possible result of this type of extrusion die is shown in FIG. 5, which shows a plastic pipe 60 consisting primarily of regions of plastic 65 free of magnetic particles, but also containing stripes of material 70 which contain uniformly distributed magnetic particles 75. These stripes 70 run longitudinally down the pipe.

Figure 6:
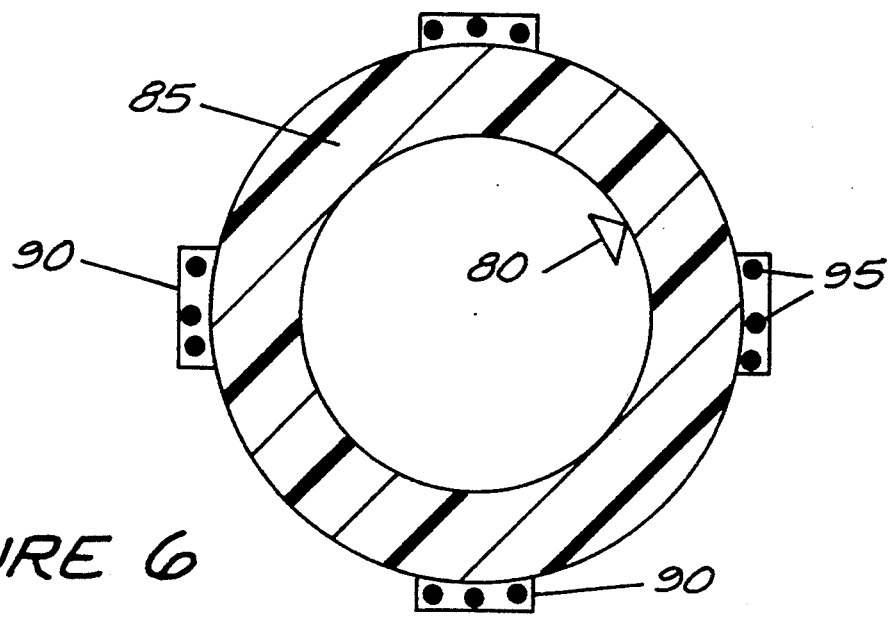
FIG. 6 is a lateral cross section of an extruded plastic pipe with stripes of material containing particles of uniformly dispersed magnetic material.

FIG. 6 shows a plastic pipe 80 in which the cylindrical cross section 85 is free of magnetic particles. Strips 90 which run down the length of the pipe contain magnetic particles 95 uniformly distributed. The strips 90 may be extruded while the pipe is formed, or they may be formed separately and adhered to the surface of the wall of the pipe.

The method of mixing of plastics and magnetizable particles as described above is that generally described in my U.S. Pat. Nos. 5,051,034 and 5,036,210 and illustrates that strontium ferrite is equally as suitable for those embodiments and methods as the barium ferrite and iron oxide previously described.

The remainder of this specification describes first, a method of aligning the magnetic moments of the particles, and then various methods of encoding information in magnetically detectable plastic pipe containing particles of strontium ferrite, barium ferrite, iron oxide, or other suitable magnetic materials.

Methods of Magnetizing the Pipes

The particles of iron oxide, barium ferrite, or strontium ferrite or other suitable materials are not magnetic at the time of starting fabrication of the pipe. Each particle contains a single magnetic domain. The assembly of particles is randomly oriented, therefore the pipe containing the particles is not magnetic and has no macroscopic magnetic signature.

Figure 7:
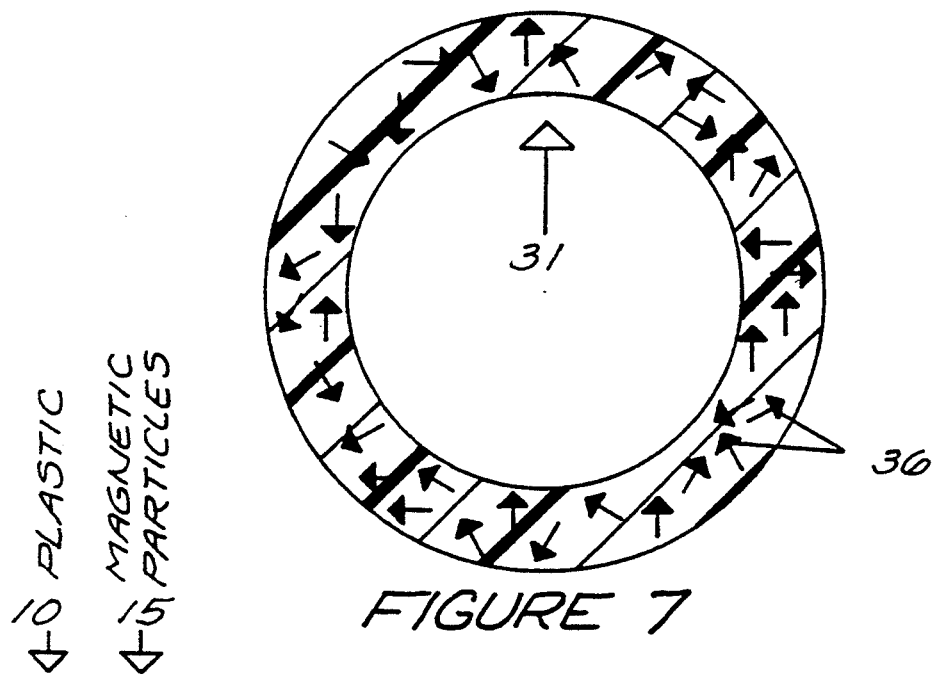
FIG. 7 is a lateral cross section of an extruded non-magnetized plastic pipe containing randomly oriented particles of uniformly dispersed magnetic material.

FIG. 7 shows a plastic pipe 31 in which the magnetic moments of the particles 36 are randomly oriented and the pipe 31 has not been magnetized. In this figure, the magnetic moments of the particles 36 are represented by arrows. Each arrow points in the preferred direction of magnetization for that magnetic particle 36. Since the magnetic particles 36 have not yet been magnetized, the pipe 31 has virtually no magnetic signature, and it is not detectable from a distance, e.g., from the surface in the case of buried pipe by any conventional means.

To create a magnetically detectable pipe, it is necessary to magnetize the particles by applying a magnetic field. The applied magnetic field will orient the magnetic domains of the particles to produce permanent magnetic portions in the pipe.

Figure 8:
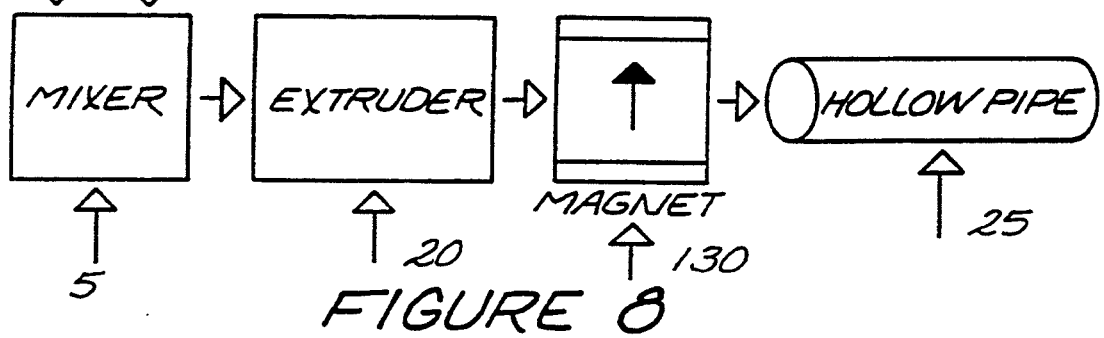
FIG. 8 is a flow diagram of the extrusion or coextrusion of plastic pipe containing particles of magnetic material, which also shows the magnet required to magnetize the particles.

FIG. 8 shows a flow diagram including the steps of FIG. 1 and additionally including a magnet 130 for magnetizing the pipe. The magnet 130 may be a solenoid or a permanent magnet as needed. The magnet may be designed to apply a constant magnetic field or it may apply a magnetic field in the form of a short pulse. The magnetization is applied diametrically across the pipe to magnetize selected portions of the pipe diametrically across the pipe so that in any lateral cross section of the pipe the north pole is at one side of the pipe and the south pole is diametrically opposite it, as seen in FIGS. 9–14.

It is important to realize that the magnetic particles 36 have a preferred direction of magnetization, which depends partly on their shape. The iron oxide particles used are shaped like needles. The barium ferrite particles used are disk-shaped platelets. For example, the preferred direction of magnetization of needle-shaped iron oxide particles is along the length of the needle. Iron oxide particles gain the strongest magnetization when they are "pointing" in a direction parallel to the applied magnetic field.

The greater their angle of misorientation with the applied magnetic field, the less they can be magnetized. Iron oxide particles pointing at right angles to the applied magnetic field do not become magnetized at all. Barium ferrite platelets, however, are preferably magnetized across the platelets.

Magnetizing the Pipe after it Solidifies

Generally speaking, for ease of handling the pipe, it is desirable to magnetize the pipe after it solidifies. When the pipe solidifies, the magnetic particles become frozen in their randomly oriented physical positions. When a magnetic field is applied to magnetize the particles, those particles whose preferred direction of magnetization happens to be parallel to the applied magnetic field will become strongly magnetized. At the other extreme, the particles whose preferred direction of magnetization happens to be perpendicular to the applied to the magnetic field will not magnetized at all, and thus will make no contribution to the magnetization of the pipe. Particles with intermediate orientations that is, those whose preferred direction of magnetization is at an angle equal to or greater than 0° and equal to or less than 90° to the direction of the applied magnetic field will make some contribution which, however, diminishes as the angle increases toward 90°.

Figure 9:
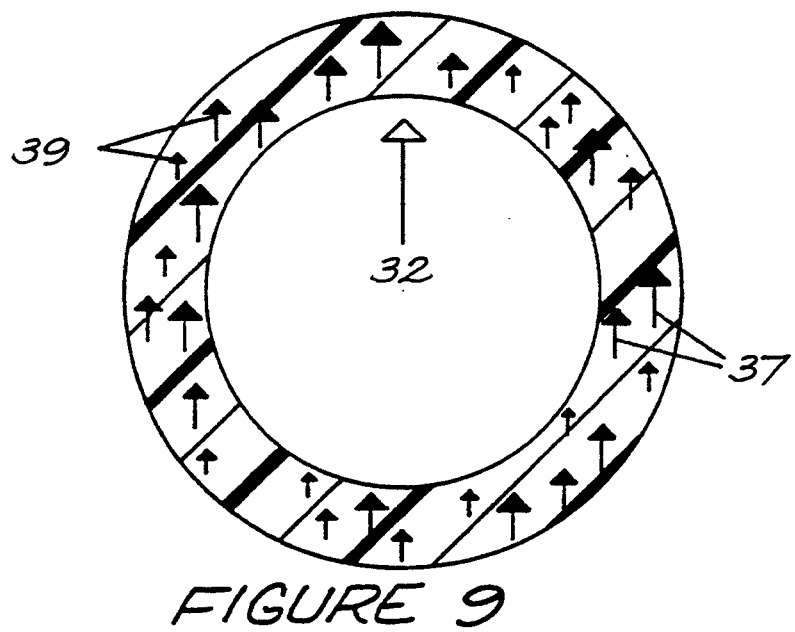
FIG. 9 is a lateral cross section of an extruded magnetized plastic pipe containing particles of magnetic material which make different contributions to the magnetization of the pipe, depending on their magnetic orientation.

FIG. 9 shows a pipe 32 which was magnetized after it solidified. Again, the magnetic particles 37, 39 are represented by arrows. In this case, however, the symbolism of the arrows is different: all the arrows point in the direction of the magnetization of the pipe, regardless of the physical orientation of the particles they represent.

The size of the arrows varies to reflect the fact that different magnetic particles 37, 39 make different contributions to the magnetization of the pipe, depending on their orientation. Magnetic particles 37 oriented with their preferred direction of magnetization parallel to the direction of magnetization of the pipe make the largest contributions and therefore have the largest arrows.

However, magnetic particles 39 oriented so that their preferred direction of magnetization is at some angle with the direction of magnetization of the pipe have smaller arrows. Magnetic particles with their preferred direction of magnetization at right angles make no contribution whatever to the magnetization of the pipe and are therefore not shown at all.

Magnetizing the Pipe before it Solidifies

Another method is to magnetize the pipe during extrusion, or soon after extrusion before the pipe solidifies. Under these circumstances, the applied magnetic field will not only magnetize the particles, it will also cause them to change their physical orientation, i.e., to align themselves so that their preferred direction of magnetization is parallel to the applied magnetic field just as iron filings align themselves parallel to the field of a bar magnet. As a result, each magnetic particle will give a maximum contribution to the magnetization of the pipe, and the magnetization of the pipe will be maximized. While magnetization of the particles while the plastic is still fluid or plastic facilitates realignment of the magnetic particles, it makes the handling of the pipe more difficult at this time and there is a somewhat lower permanent magnetism achieved (due to possibly exceeding the Curie point of the material).

Figure 10:
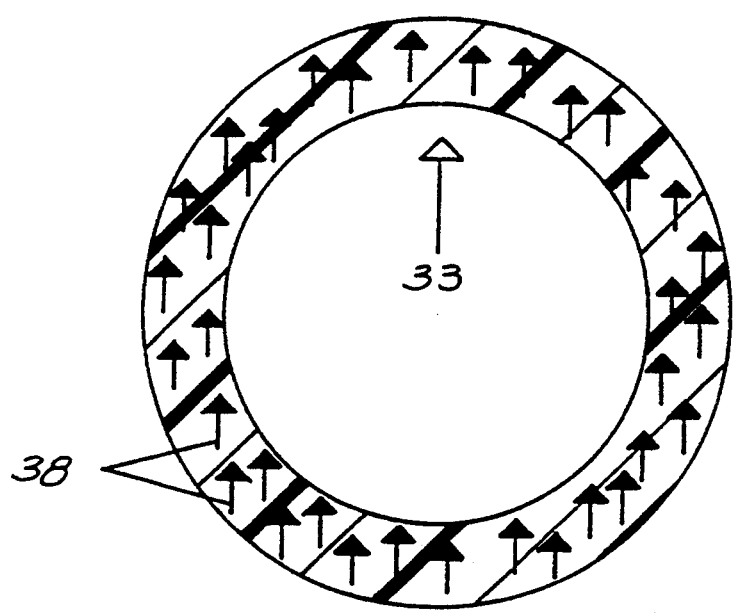
FIG. 10 is a lateral cross section of an extruded magnetized plastic pipe containing particles of magnetic material, all of which make strong contributions to the magnetization of the pipe because they have been oriented so that their preferred direction of magnetization is parallel to the direction of magnetization of the pipe.

FIG. 10 shows a pipe 33 which was magnetized before it solidified. As in FIG. 9, the magnetic particles 38 are represented by arrows, and the size of the arrow corresponds to its contribution to the magnetization of the pipe. In this case, since all the particles are physically aligned in the most desirable orientation, the arrows are uniformly large. The magnetization of the pipe 33 may be maximized. Such a strongly magnetized pipe 33 is, of course, relatively easy to detect from above the ground.

FIG. 10 shows an ideal case in which all the magnetic particles have the most desirable physical alignment. In practice, the limits to which one can approach this ideal case depends on factors such as the viscosity of the plastic, the strength of the magnetic field and the Curie point of the magnetic particles.

Figure 11:
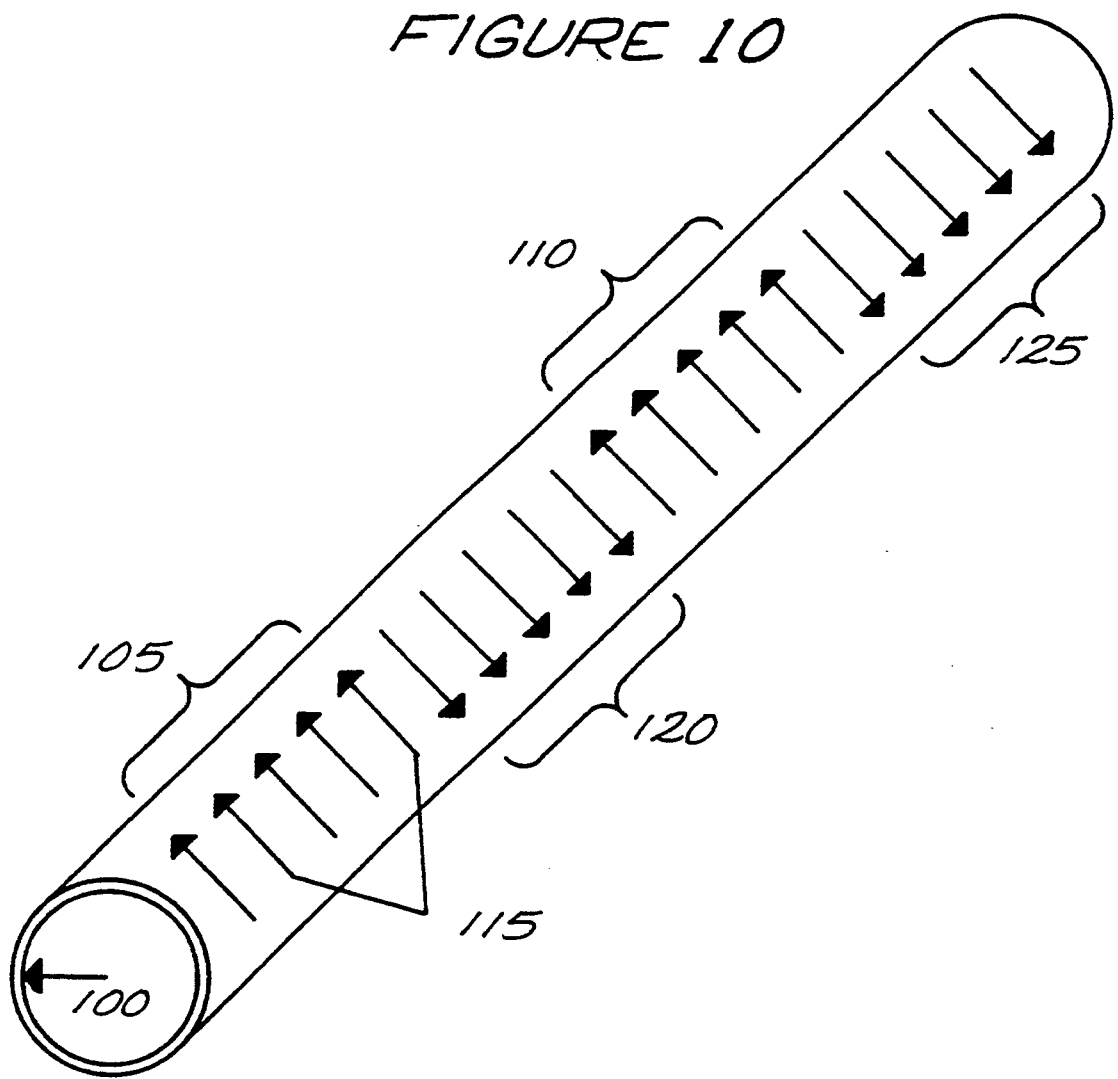
FIG. 11 is an isometric view of extruded plastic pipe in which the orientation of the magnetic particles varies in different regions as a means of encoding information.

Pipes Encoded with Magnetic Information and Methods of Fabricating them where the Direction of the Field is Reversed Periodically This embodiment of the invention encodes magnetic information by reversing the direction of magnetization of the magnetic particles at regular intervals. FIG. 11 shows a plastic pipe 100 which contains regions 105, 110 in which the magnetic particles 115 are oriented with their magnetization pointing from right to left, and regions 120, 125 in which the magnetic particles 115 are oriented with the magnetization pointing from left to right. This system is useful because it provides a way to distinguish magnetically detectable plastic pipes from iron pipes.

A suitable magnetic sensor located above the ground can indicate the reversal of direction of the magnetic field. The relative lengths of the regions 105, 110, 115, 120 can convey information such as the diameter or depth of the pipe.

Such a pipe can be made by the method shown in the flow diagram shown in FIG. 8, provided that the magnet 130 can reverse the direction of the magnetic field at regular intervals along the length of the extruded pipe.

One possible drawback of the pipe 100 shown in FIG. 11 is that successful detection from above the ground may require that the pipe be laid in the ground with a specific orientation. Although some types of magnetic detection apparatus are sensitive to both horizontal and vertical components of magnetic field, the simplest types are sensitive to one or the other, but not both.

Figure 12:
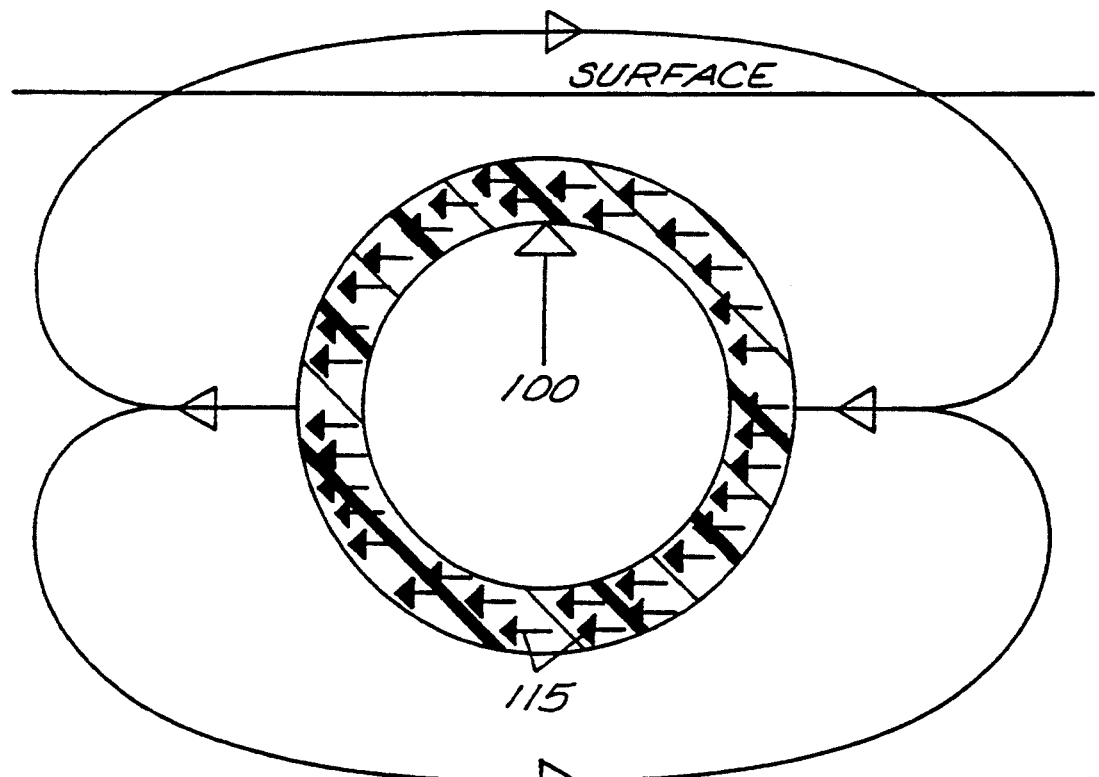
FIG. 12 is a lateral cross section of an extruded plastic pipe containing uniformly dispersed particles of magnetic material, in which the magnetic particles produce a magnetic field pointing from right to left within the diameter of the pipe.
Figure 13:
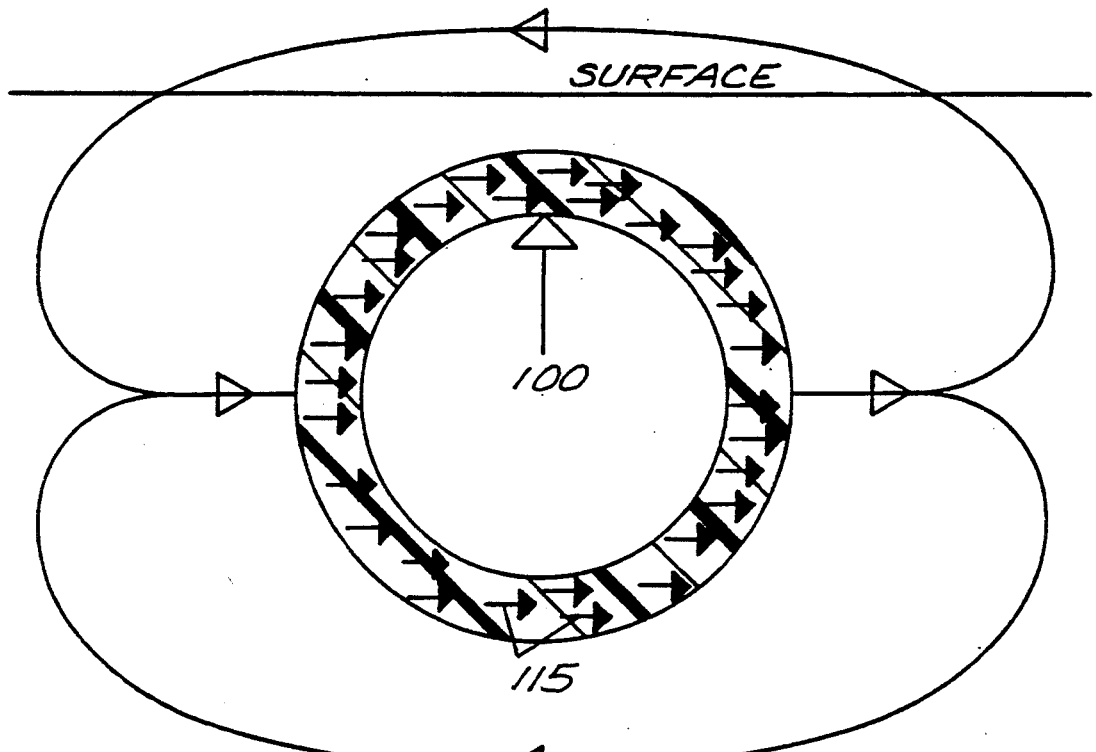
FIG. 13 is a lateral cross section of an extruded plastic pipe containing uniformly dispersed particles of magnetic material, in which the magnetic particles produce a magnetic field pointing from left to right within the diameter of the pipe.
Figure 14:
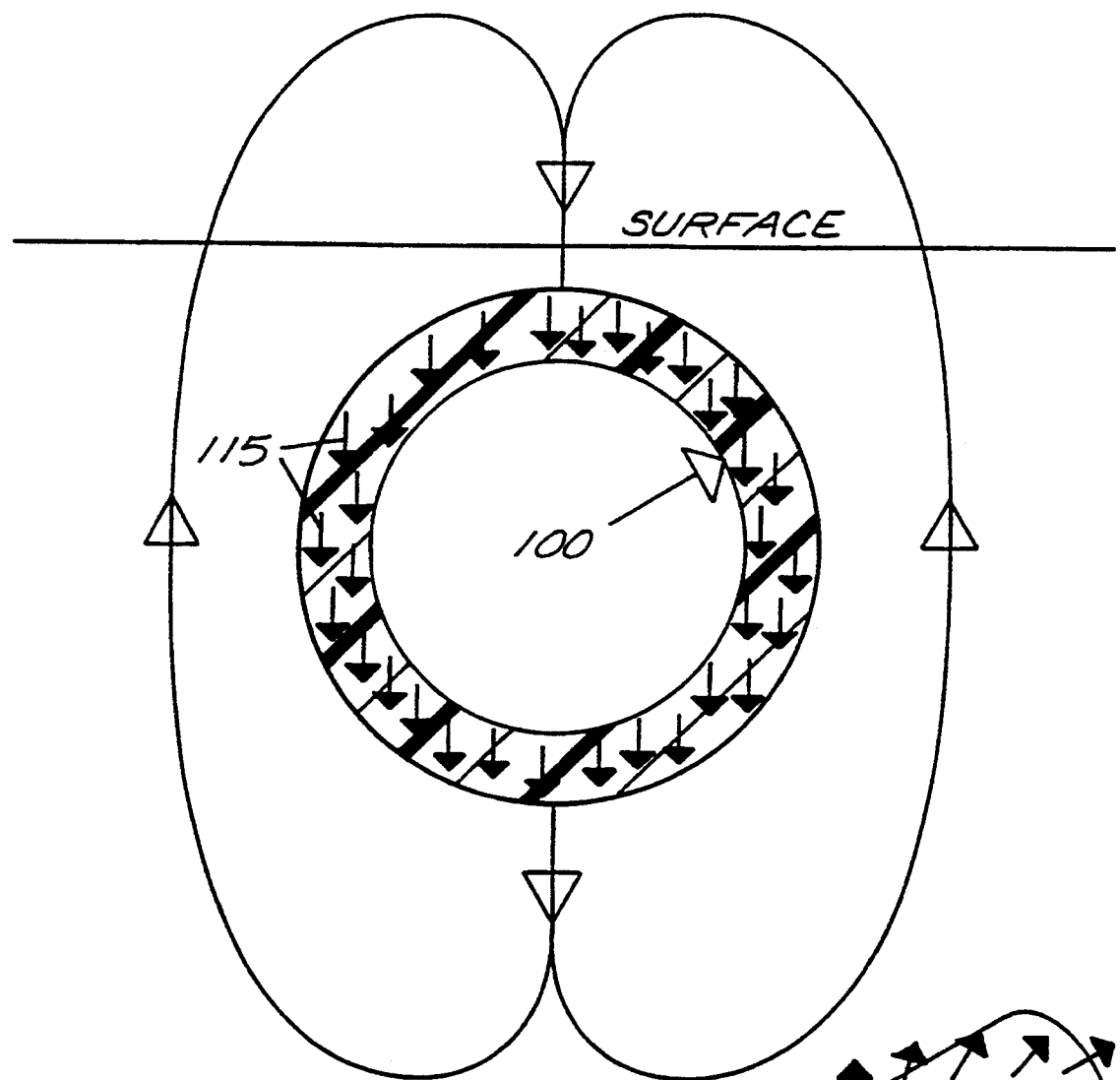
FIG. 14 is a lateral cross section of an extruded plastic pipe containing uniformly dispersed particles of magnetic, in which the magnetic particles produce a magnetic field pointing from top to bottom within the diameter of the pipe.

The FIGS. 12, 13 and 14 illustrate how buried pipe such as the one shown in FIG. 11 can be seen, or not seen, with a magnetic detection apparatus sensitive to horizontally oriented magnetic fields, i.e., a "horizontal sensor".

FIG. 12 shows a cross section of the pipe 100 shown in FIG. 11—specifically, a cross section of a region 105 or 100 where the magnetic particles 115 produce a field pointing from right to left. The magnetic field lines then point from left to right above the ground, and a horizontal sensor will detect them without difficulty.

FIG. 13 shows a different cross section of the same pipe 100, this time representing a region 120 or 125 in which the magnetic particles 115 produce a field pointing from left to right. The magnetic field lines then point from right to left above the ground. In this case also, they may be detected with a horizontal sensor.

FIG. 14, however, shows a cross section of the same pipe 100 in which the magnetic particles 115 produce a field pointing down. In this case, the magnetic field lines are vertical at the surface, and a horizontal sensor will not sense them. The same problem would occur, of course, if the magnetic particles produced a field pointing up.

If a vertical detector is used, i.e., one which is oriented to vertical magnetic fields, then it would detect a pipe oriented as in FIG. 14, but would not see the pipe oriented as in FIGS. 12 and 13 in a horizontal direction.

Piped having the Direction of the Magnetization Spiralled

Figure 15:
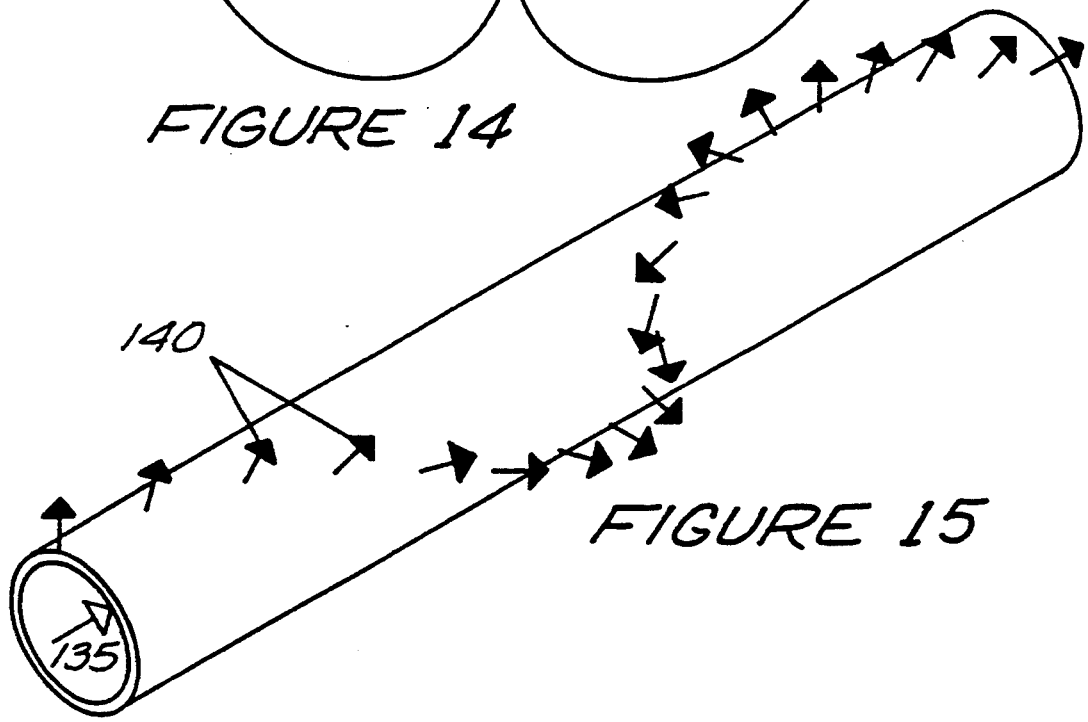
FIG. 15 is an isometric view of a plastic pipe which is magnetized across its diameter in a spiraled pattern, the period of the spiral being a means of encoding information.

In this system of magnetizing the pipe, the pipe is not required to be laid with a specific orientation. In FIG. 15, a plastic pipe 135 has the direction of alignment of the magnetic particles 140 spiraled along the length of the pipe. Throughout the pipe 135, the particles 140 are magnetized along the diameter of the pipe but the orientation of the magnetization rotates continuously as the pipe length is traversed. This pipe 135 is useful in that the magnetic detection process does not depend on the pipe's orientation. The pipe can be buried in any orientation without affecting its basic magnetic signature.

One method of creating such a pipe involves continuously rotating the magnet 130 (FIG. 8) as the pipe is extruded or if the magnetization is done after the pipe is cut to length, the pipe can be rotated and the magnet 130 kept stationary. In another magnetization procedure, the magnet 130 may rotate (oscillate) continuously back and forth, producing a reversing spiral.

Figure 16:
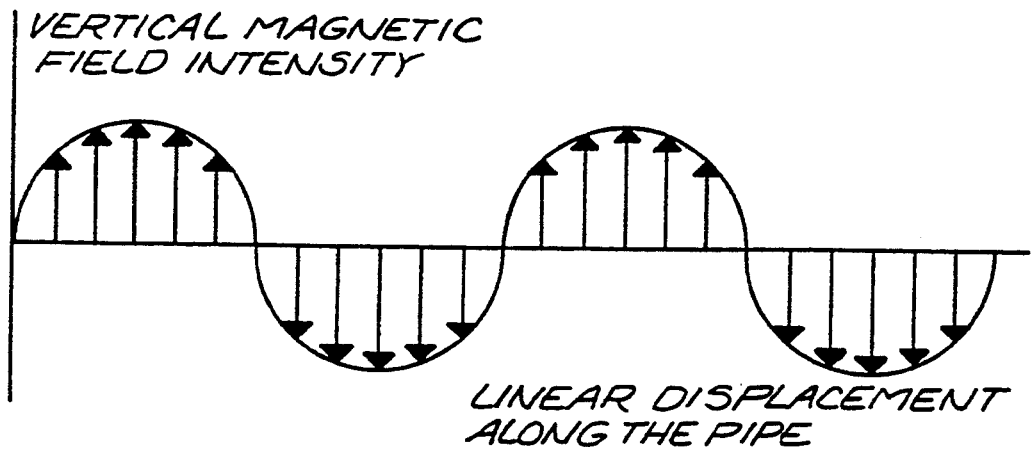
FIG. 16 is a plot of vertical magnetic field intensity as a function of linear distance along the pipe shown in FIG. 15.
Figure 17A:
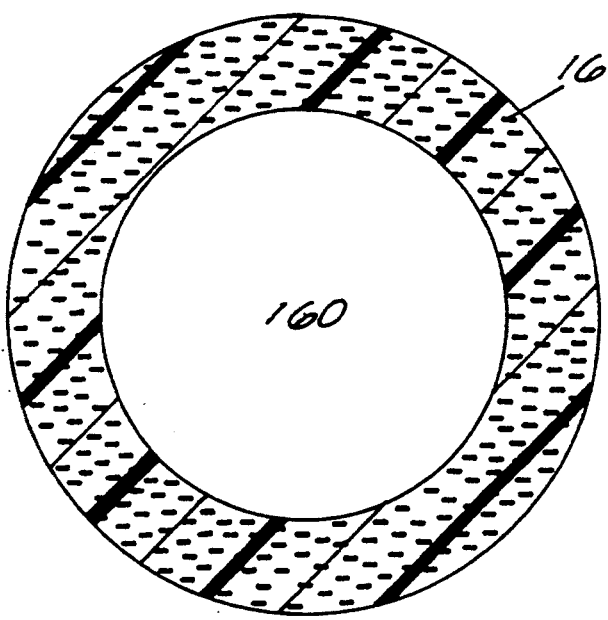
FIG. 17 shows lateral cross sections of pipes with four different diameters but the same concentration of magnetic material.
Figure 17B:
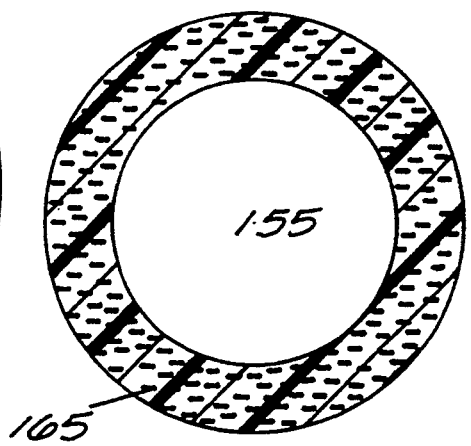
Figure 17C:
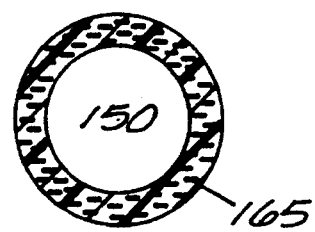
Figure 17D:
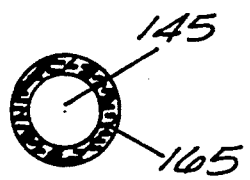
Figure 18A:
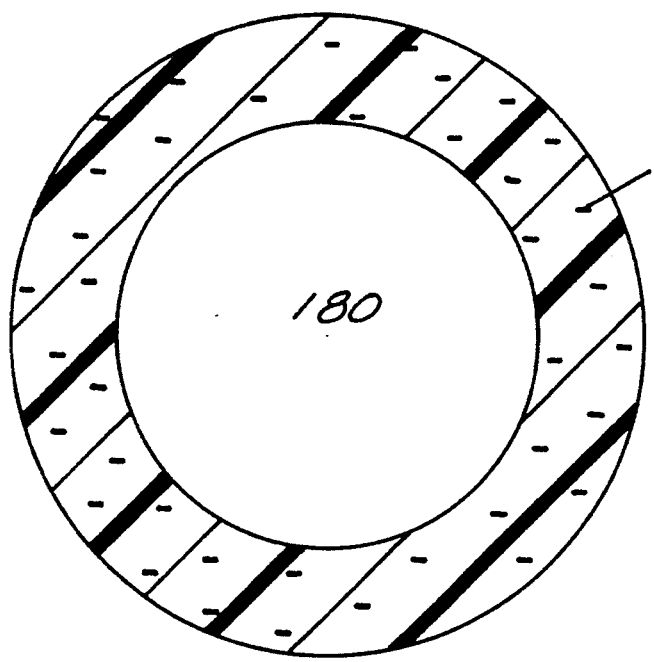
FIG. 18 shows lateral cross sections of pipes with four different diameters, in which the concentrations of magnetic material vary so that each pipe has the same magnetization.
Figure 18B:
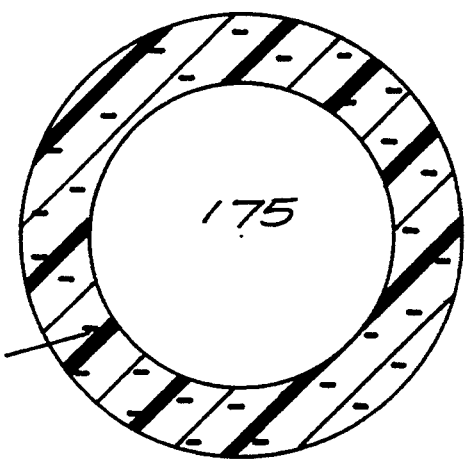
Figure 18C:
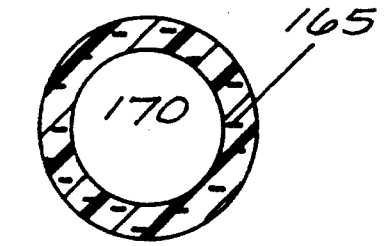
Figure 18D:
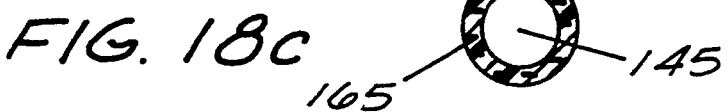

If one walked along this buried pipe 135 with a vertical or horizontal sensor, the magnetic signal at the surface would rise to a positive peak, fall to zero, sink to a negative peak, rise to zero, and then repeat in a regular pattern. This pattern is shown in FIG. 16, a plot of vertical magnetic field intensity as a function of linear displacement along the pipe. A magnetic sensing apparatus on the surface can display this regular pattern by visual or audible signals.

It is also possible to encode the size of the pipe into the frequency, or period, of the spiralling. The period of the spiralling should be long compared to the depth of the pipe in order to avoid errors in reading caused by cancellation of adjacent magnetic field lines. Since larger pipes are usually buried deeper, one reasonable possibility is to use a 20' period for pipes 6" in diameter, a 12' period for pipes 2" in diameter, etc.

Let us assume the magnetization of each size of pipe is determined or known. Once the observer above ground ascertains the diameter of the pipe from the length of the period, he can then calculate the depth of the pipe from the measured magnetic field strength at the surface. The magnetic sensing apparatus can be engineered to display this information automatically.

Pipes in which the Strength of the Magnetization is Independent of Diameter

In most cases, the pipe magnetization will vary strongly with the diameter of the pipe. FIG. 17 shows cross sections of pipes with four different diameters—a 1" pipe 145, a 2" pipe 150, a 4" pipe 155, and a 6" pipe 160. Each of these pipes contains the same concentration of magnetic particles 165. It is easy to see that the 6" pipe 160 has a much larger magnetic signal than the 1" pipe 145, since the 6" pipe 160 contains a much greater number of magnetic particles 165. Thus, the size of pipe can be determined from the intensity of the signal where equal concentrations of magnetic particles are used in different pipe sizes.

In another encoding system, the concentration of magnetic particles is adjusted in pipes of various diameters so that their magnetization is independent of their diameter. This strategy, of course, requires that the magnetic particles be less dense in the larger pipes than in the smaller pipes. FIG. 18 shows cross sections of a 1" pipe 145, the same 2" pipe shown in FIG. 17, and also a 2" pipe 170, a 4" pipe 175, and a 6" pipe 180 in which the density of magnetic particles 165 has been adjusted to give each pipe the same magnetization.

Since the magnetization is equal for all of these pipes, the strength of the magnetic field at the surface can be used to determine the buried depth of the pipe regardless of the pipe diameter. When the field strength is measured at the surface, the depth of the pipe can be calculated—or the system can calculate it automatically. Since this encoding system gives no information about the diameter of the pipe, it is best suited for organizations that keep records of the diameter of underground pipes.

This invention has been described with special emphasis on the detection of pipe buried in the ground. It should be understood that the pipe may be used in other applications and readily detected by the same magnetic detector as is used for detecting underground pipe. This pipe may be used in buildings and its location detected as described. The magnetic pipe is also easier to inventory since it can be counted by use of a magnetic detector. The encoding of information on the pipe not only assists in location of the pipe but also in determining encoded information, e.g., date of installation, manufacturer brand name; size; other characteristics, etc.

While this invention has been described fully and completely with special emphasis on certain preferred embodiments, it should be understood that within the scope of the appended claims the invention may be practiced otherwise than as specifically described.

I claim:

1. A method of producing magnetically detectable plastic pipe for underground use, comprising;
   providing an organic plastic for extrusion,
   providing particles of magnetic material comprising electrically-nonconductive, highly-magnetizable iron oxide, barium ferrite or strontium ferrite,
   mixing said particles of electrically-nonconductive, highly-magnetizable iron oxide, barium ferrite or strontium ferrite uniformly with said organic plastic,
   heating and extruding said mixture of organic plastic and particles of electrically-nonconductive, highly-magnetizable iron oxide, barium ferrite or strontium ferrite to produce a hollow tubular plastic pipe with said particles distributed continuously around and within the wall thereof,
   moving said pipe through a magnet to magnetize selected portions of said pipe diametrically across the pipe so that in any lateral cross section of the pipe a north pole is at one side of the pipe and a south pole is diametrically opposite it.

2. A method according to claim 1 in which
   said particles of electrically-nonconductive, highly-magnetizable iron oxide, barium ferrite or strontium ferrite are selectively magnetized after formation and cooling of said pipe to encode data therein readable from a distance.

3. A method according to claim 1 in which
   said particles of electrically-nonconductive, highly-magnetizable iron oxide, barium ferrite or strontium ferrite are selectively magnetized after formation but prior to solidification and cooling of said pipe in order to physically align said particles of magnetic material so their preferred direction of magnetization is parallel to the applied magnetic field to encode data therein readable from a distance.

4. A method according to Claim 1 including
   the additional step of adjusting the concentration of said particles of magnetic material so the magnetization of said pipe will equal the magnetization of other magnetically detectable plastic pipes with different diameters.

5. A method according to claim 1 in which
   said pipe is moved through said magnet and said magnet and said pipe rotated relative to each other to produce a spiral pattern of diametrical magnetization in said pipe.

6. A method according to claim 1 in which
   said pipe is moved through said magnet and said magnet and said pipe rotated relative to each other in alternating directions to produce a reversible spiral pattern of diametrical magnetization in said pipe.

7. A method according to claim 1 in which
   said pipe is moved through said magnet and said magnet and said pipe rotated relative to each other at varying rates to produce a variable pitch of spiral pattern of diametrical magnetization in said pipe.

8. A method according to claim 1 in which
   said pipe is moved through said magnet and said magnet is selectively reversed in polarity to produce a selected arrangement of diametrically magnetized portions of said pipe of selected different polarities.

9. A method according to claim 1 in which
   said particles of magnetic material are uniformly distributed throughout the thickness of the wall of said plastic pipe, and
   uniformly distributed around the entire circumference of said plastic pipe.

* * * * *